US012423299B2

(12) United States Patent
Zmigrod et al.

(10) Patent No.: US 12,423,299 B2
(45) Date of Patent: Sep. 23, 2025

(54) METHOD AND SYSTEM FOR IMITATION CONVERSION FIXES BETWEEN STRUCTURED QUERY LANGUAGE (SQL) DIALECTS

(71) Applicant: JPMorgan Chase Bank, N.A., New York, NY (US)

(72) Inventors: Ran Zmigrod, Cambridge (GB); Salwa Husam Alamir, Bournemouth (GB); Parag Sharma, Mumbai (IN); Bhagyalakshmi Rathakrishnan, Bengaluru (IN); Harsha Valaturu, Bengaluru (IN); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 35 days.

(21) Appl. No.: 18/212,443

(22) Filed: Jun. 21, 2023

(65) Prior Publication Data
US 2024/0370431 A1 Nov. 7, 2024

(30) Foreign Application Priority Data
May 5, 2023 (IN) .............................. 202311032063

(51) Int. Cl.
*G06F 16/2453* (2019.01)
*G06F 16/242* (2019.01)
(52) U.S. Cl.
CPC .... *G06F 16/24534* (2019.01); *G06F 16/2433* (2019.01)
(58) Field of Classification Search
None
See application file for complete search history.

(56) References Cited

U.S. PATENT DOCUMENTS 7,664,795 B2 * 2/2010 Balin .................... G06F 16/214
717/172
2014/0280259 A1 * 9/2014 McGillin ............ G06F 16/2452
707/756
(Continued)

FOREIGN PATENT DOCUMENTS

CN 101405729 A * 4/2009 ....... G06F 16/24539
CN 109062918 A * 12/2018

OTHER PUBLICATIONS

Feasel, Kevin, and Kevin Feasel. "Common Hadoop and Blob Storage Integration Errors." PolyBase Revealed: Data Virtualization with SQL Server, Hadoop, Apache Spark, and Beyond (2020): 127-149. (Year: 2020).*

(Continued)

*Primary Examiner* — Uyen T Le
(74) *Attorney, Agent, or Firm* — Greenblum & Bernstein, P.L.C.

(57) ABSTRACT

A system for correcting a Structured Query Language (SQL) dialect conversion error. The system may include a processor and memory that stores instructions that, when executed by the processor, cause the processor to perform operations. The operations may include: receiving a first partially converted SQL file that has been partially converted from a first SQL dialect into a second SQL dialect; extracting, from the first partially converted SQL file, at least one first unconverted SQL snippet; deriving at least one first transformation; determining whether the at least one first transformation includes an appropriate set of at least one transformation for correcting a corresponding SQL conversion error; and associating the appropriate set of at least one transformation with the at least one first unconverted SQL snippet.

18 Claims, 5 Drawing Sheets

(56) References Cited

U.S. PATENT DOCUMENTS

| | | | | |
|---|---|---|---|---|
| 2021/0049167 A1* | 2/2021 | Brushaber | .......... | G06F 16/2455 |
| 2021/0209098 A1* | 7/2021 | Shi | ................ | G06F 16/2452 |
| 2021/0319356 A1* | 10/2021 | Wang | ................ | G06V 30/40 |
| 2023/0039860 A1* | 2/2023 | Chipman | ............ | G06F 16/2433 |

OTHER PUBLICATIONS

Wang, Yi, Yang Yang, Weiguo Zhu, Yi Wu, Xu Yan, Yongfeng Liu, Yu Wang et al. "Sqlflow: A bridge between SQL and machine learning." arXiv preprint arXiv:2001.06846 (2020). (Year: 2020).*

* cited by examiner

METHOD AND SYSTEM FOR IMITATION CONVERSION FIXES BETWEEN STRUCTURED QUERY LANGUAGE (SQL) DIALECTS

CROSS-REFERENCE TO RELATED APPLICATIONS

This application claims priority benefit from Indian application No. 202311032063, filed May 5, 2023, which is hereby incorporated by reference in its entirety.

BACKGROUND

1. Field of the Invention

The field of the invention disclosed herein generally relates to a system for correcting a Structured Query Language (SQL) dialect conversion error and, more particularly, to a method, system, and computer-readable storage medium for utilizing imitation conversion fixes to correct SQL dialect conversion errors such as the SQL dialect conversion errors that may arise when migrating one or more electronic databases into the cloud.

2. Background of the Invention

In the computing industry, the term "cloud" has been used to refer to distributed computing platforms since the early 1990s. Since then, the term "cloud" has become ubiquitous with a range of distributed computing services that are currently being offered by various technology companies around the globe. These companies use economies of scale to lower the costs of such cloud services by purchasing their resources in massive quantities. The savings, scalability, and other advantages that are offered by these services, have motivated many companies to migrate their computing platforms into the cloud.

Current cloud migration efforts aim to migrate on-premise services, such as those provided by electronic databases, into the cloud (i.e., off-premises). However, with regard to electronic databases, differences may exist between the Structured Query Language (SQL) dialect of an on-premise source database and that of its corresponding target database located in the cloud. Additionally, conventional SQL dialect converters cannot fully convert such databases from a first SQL dialect into another SQL dialect. Therefore, conventional SQL dialect converters leave developers with the cumbersome and time-consuming task of manually converting thousands of lines of unconverted code from the first dialect into the other.

Accordingly, in the technological field of cloud migration, there is a need for a technical solution to the conventional SQL dialect converter's inability to convert every line of an electronic database's code from one SQL dialect into another.

SUMMARY

The present disclosure, through one or more of its various aspects, embodiments, and/or specific features or sub-component, provides, inter alia, various systems, servers, devices, methods, media, programs and platforms for an imitation conversion fix implementation tool that improves the overall speed, ease, and user experience of cyber defense capability assessment tasks.

According to an aspect of the present disclosure, a method is provided for correcting a Structured Query Language (SQL) dialect conversion error. The method may comprise: receiving a first partially converted SQL file that has been partially converted from a first SQL dialect into a second SQL dialect; extracting, from the first partially converted SQL file, at least one first unconverted SQL snippet; deriving at least one first transformation; determining whether the at least one first transformation includes an appropriate set of at least one transformation for correcting a corresponding SQL conversion error; and associating the appropriate set of the at least one transformation with the at least one first unconverted SQL snippet.

In the method, the at least one transformation may comprise at least one type of transformation from among insert, delete, and replace, and the replace type of transformation may comprise the insert and the delete types of transformations.

The method may further comprise, when the first partially converted SQL file comprises at least one unconverted SQL snippet that is not associated with any transformations, and until every unconverted SQL snippet of the first partially converted SQL file is associated with a corresponding transformation, iteratively: extracting, from the first partially converted SQL file, at least one snippet from among the at least one unconverted SQL snippet that is not associated with any transformations; deriving at least one additional transformation; and associating the at least one additional transformation with the at least one snippet. Additionally, the method may further comprise: when each unconverted SQL snippet of the first partially converted SQL file is associated with at least one associated transformation, generating a first fully converted SQL file that comprises the second SQL dialect of every SQL snippet of the first partially converted SQL file.

In the method, the deriving the at least one first transformation may comprise: parsing the at least one first unconverted SQL snippet into a first SQL dialect-independent tree; obtaining at least one first converted SQL snippet that corresponds to the at least one first unconverted SQL snippet; parsing the at least one first converted SQL snippet into a second SQL dialect-independent tree; evaluating at least one first tree transformation difference by comparing the first SQL dialect-independent tree to the second SQL dialect-independent tree; and deriving, based on the at least one first tree transformation difference, the at least one first transformation that is required to convert the first SQL dialect-independent tree into the second SQL dialect-independent tree. The first SQL dialect-independent tree may comprise a SQL dialect-independent tree representation of the at least one first unconverted SQL snippet, and the second SQL dialect-independent tree may comprise the SQL dialect-independent tree representation of the at least one first converted SQL snippet.

In the method, the determining comprises: providing, to a validator, the at least one first unconverted SQL snippet and the at least one first converted SQL snippet; when the at least one first converted SQL snippet comprises the second SQL dialect of the at least one first unconverted SQL snippet, receiving, from the validator, confirmation that the at least one first transformation includes the appropriate set of the at least one transformation; and when the at least one first converted SQL snippet does not comprise the second SQL dialect of the at least one first unconverted SQL snippet: receiving, from the validator, the second SQL dialect of the at least one first unconverted SQL snippet; and determining the appropriate set of the at least one transformation.

In the method, the validator may comprise at least one from among: a user, a computer specialist, and an artificial intelligence and machine learning (AI/ML) model.

In the method, the determining the appropriate set of the at least one transformation may comprise: parsing the second SQL dialect of the at least one first converted SQL snippet into a third SQL dialect-independent tree; determining, by comparing the first SQL dialect-independent tree to the third SQL dialect-independent tree, at least one second tree transformation difference; and determining, based on the at least one second tree transformation difference, the appropriate set of the at least one transformation. The third SQL dialect-independent tree may comprise the SQL dialect-independent tree representation of the second SQL dialect of the at least one first unconverted SQL snippet. The appropriate set of the at least one transformation may be required to convert the first SQL dialect-independent tree into the third SQL dialect-independent tree.

In the method, determining the at least one transformation based on at least one tree transformation difference comprises: following a first path of a first tree transformation and a second path of a second tree transformation; determining at least one difference between at least one first branch along the first path and at least one second branch along the second path; and determining the at least one transformation that eliminates the at least one difference when the at least one transformation is performed on the first tree.

The method may further comprise: receiving a second partially converted SQL file that has been partially converted from the first SQL dialect into the second SQL dialect; extracting, from the second partially converted SQL file, at least one second unconverted SQL snippet; determining that the at least one second unconverted SQL snippet is the same as the first partially unconverted SQL snippet; and converting the at least one second unconverted SQL snippet into the second SQL dialect of the at least one second unconverted SQL snippet.

In the method, the converting may further comprise: parsing the at least one second unconverted SQL snippet into a SQL dialect-independent tree representation of the at least one second unconverted SQL snippet; generating a SQL dialect-independent tree representation of at least one second converted SQL snippet by applying the appropriate set of the at least one transformation to the SQL dialect-independent tree representation of the at least one second unconverted SQL snippet; and parsing the SQL dialect-independent tree representation of the at least one second converted SQL snippet into the second SQL dialect of the at least one second unconverted SQL snippet.

According to another aspect of the present disclosure, a system is provided for correcting a Structured Query Language (SQL) dialect conversion error. The system may comprise: a processor; and memory storing instructions. When executed by the processor, the instructions cause the processor to perform operations comprising: receiving a first partially converted SQL file that has been partially converted from a first SQL dialect into a second SQL dialect; extracting, from the first partially converted SQL file, at least one first unconverted SQL snippet; deriving at least one first transformation; determining whether the at least one first transformation includes an appropriate set of at least one transformation for correcting a corresponding SQL conversion error; and associating the appropriate set of the at least one transformation with the at least one first unconverted SQL snippet.

In the system, the at least one transformation may comprise at least one type of transformation from among insert, delete, and replace, and the replace type of transformation may comprise the insert and the delete types of transformations.

In the system, the instructions, when executed by the processor, may further cause the processor to perform operations comprising, when the first partially converted SQL file comprises at least one unconverted SQL snippet that is not associated with any transformations, and until every unconverted SQL snippet of the first partially converted SQL file is associated with a corresponding transformation, iteratively: extracting, from the first partially converted SQL file, at least one snippet from among the at least one unconverted SQL snippet that is not associated with any transformations; deriving at least one additional transformation; and associating the at least one additional transformation with the at least one snippet; and when each unconverted SQL snippet of the first partially converted SQL file is associated with at least one associated transformation, generating a first fully converted SQL file that comprises the second SQL dialect of every SQL snippet of the first partially converted SQL file.

In the system, the deriving the at least one first transformation may comprise: parsing the at least one first unconverted SQL snippet into a first SQL dialect-independent tree; obtaining at least one first converted SQL snippet that corresponds to the at least one first unconverted SQL snippet; parsing the at least one first converted SQL snippet into a second SQL dialect-independent tree; evaluating at least one first tree transformation difference by comparing the first SQL dialect-independent tree to the second SQL dialect-independent tree; and deriving, based on the at least one first tree transformation difference, the at least one first transformation that is required to convert the first SQL dialect-independent tree into the second SQL dialect-independent tree. The first SQL dialect-independent tree may comprise a SQL dialect-independent tree representation of the at least one first unconverted SQL snippet, and the second SQL dialect-independent tree may comprise the SQL dialect-independent tree representation of the at least one first converted SQL snippet.

In the system, the determining may comprise: providing, to a validator, the at least one first unconverted SQL snippet and the at least one first converted SQL snippet; when the at least one first converted SQL snippet comprises the second SQL dialect of the at least one first unconverted SQL snippet, receiving, from the validator, confirmation that the at least one first transformation includes the appropriate set of the at least one transformation; and when the at least one first converted SQL snippet does not comprise the second SQL dialect of the at least one first unconverted SQL snippet: receiving, from the validator, the second SQL dialect of the at least one first unconverted SQL snippet; and determining the appropriate set of the at least one transformation.

In the system, the validator may comprise at least one from among: a user, a computer specialist, and an artificial intelligence and machine learning (AI/ML) model.

In the system, the determining the appropriate set of the at least one transformation may comprise: parsing the second SQL dialect of the at least one first converted SQL snippet into a third SQL dialect-independent tree; determining, by comparing the first SQL dialect-independent tree to the third SQL dialect-independent tree, at least one second tree transformation difference; and determining, based on the at least one second tree transformation difference, the appropriate set of the at least one transformation. The third SQL dialect-independent tree may comprise the SQL dialect-independent tree representation of the second SQL dialect of the at least one first unconverted SQL snippet, and the appropriate set of the at least one transformation may be required to convert the first SQL dialect-independent tree into the third SQL dialect-independent tree In the system, determining the at least one transformation based on at least one tree transformation difference may comprise: following a first path of a first tree transformation and a second path of a second tree transformation; determining at least one difference between at least one first branch along the first path and at least one second branch along the second path; and determining the at least one transformation that eliminates the at least one difference when the at least one transformation is performed on the first tree.

In the system, the instructions, when executed by the processor, may further cause the processor to perform operations comprising: receiving a second partially converted SQL file that has been partially converted from the first SQL dialect into the second SQL dialect; extracting, from the second partially converted SQL file, at least one second unconverted SQL snippet; determining that the at least one second unconverted SQL snippet is the same as the first partially unconverted SQL snippet; and converting the at least one second unconverted SQL snippet into the second SQL dialect of the at least one second unconverted SQL snippet.

In the system, the converting may further comprise: parsing the at least one second unconverted SQL snippet into a SQL dialect-independent tree representation of the at least one second unconverted SQL snippet; generating a SQL dialect-independent tree representation of at least one second converted SQL snippet by applying the appropriate set of the at least one transformation to the SQL dialect-independent tree representation of the at least one second unconverted SQL snippet; and parsing the SQL dialect-independent tree representation of the at least one second converted SQL snippet into the second SQL dialect of the at least one second unconverted SQL snippet.

According to yet a further aspect of the present disclosure, a non-transitory computer-readable medium storing executable instructions is provided for correcting a Structured Query Language (SQL) dialect conversion error. The non-transitory computer-readable medium may comprise instructions that, when executed by a processor, may cause the processor to perform operations comprising: receiving a first partially converted SQL file that has been partially converted from a first SQL dialect into a second SQL dialect; extracting, from the first partially converted SQL file, at least one first unconverted SQL snippet; deriving at least one first transformation; determining whether the at least one first transformation includes an appropriate set of at least one transformation for correcting a corresponding SQL conversion error; and associating the appropriate set of the at least one transformation with the at least one first unconverted SQL snippet.

In the computer-readable medium, the at least one transformation may comprise at least one type of transformation from among insert, delete, and replace, and the replace type of transformation may comprise the insert and the delete types of transformations.

In the computer-readable medium, the instructions, when executed by the processor, may cause the processor to perform operations further comprising, when the first partially converted SQL file comprises at least one unconverted SQL snippet that is not associated with any transformations, and until every unconverted SQL snippet of the first partially converted SQL file is associated with a corresponding transformation, iteratively: extracting, from the first partially converted SQL file, at least one snippet from among the at least one unconverted SQL snippet that is not associated with any transformations; deriving at least one additional transformation; and associating the at least one additional transformation with the at least one snippet; and when each unconverted SQL snippet of the first partially converted SQL file is associated with at least one associated transformation, generating a first fully converted SQL file that comprises the second SQL dialect of every SQL snippet of the first partially converted SQL file.

In the computer-readable medium, the instructions, the deriving the at least one first transformation may comprise: parsing the at least one first unconverted SQL snippet into a first SQL dialect-independent tree; obtaining at least one first converted SQL snippet that corresponds to the at least one first unconverted SQL snippet; parsing the at least one first converted SQL snippet into a second SQL dialect-independent tree; evaluating at least one first tree transformation difference by comparing the first SQL dialect-independent tree to the second SQL dialect-independent tree; and deriving, based on the at least one first tree transformation difference, the at least one first transformation that is required to convert the first SQL dialect-independent tree into the second SQL dialect-independent tree. The first SQL dialect-independent tree may comprise a SQL dialect-independent tree representation of the at least one first unconverted SQL snippet, and the second SQL dialect-independent tree may comprise the SQL dialect-independent tree representation of the at least one first converted SQL snippet.

In the computer-readable medium, the determining may comprise: providing, to a validator, the at least one first unconverted SQL snippet and the at least one first converted SQL snippet; when the at least one first converted SQL snippet comprises the second SQL dialect of the at least one first unconverted SQL snippet, receiving, from the validator, confirmation that the at least one first transformation includes the appropriate set of the at least one transformation; and when the at least one first converted SQL snippet does not comprise the second SQL dialect of the at least one first unconverted SQL snippet: receiving, from the validator, the second SQL dialect of the at least one first unconverted SQL snippet; and determining the appropriate set of the at least one transformation.

In the computer-readable medium, the validator may comprise at least one from among: a user, a computer specialist, and an artificial intelligence and machine learning (AI/ML) model.

In the computer-readable medium, the determining the appropriate set of the at least one transformation may comprise: parsing the second SQL dialect of the at least one first converted SQL snippet into a third SQL dialect-independent tree; determining, by comparing the first SQL dialect-independent tree to the third SQL dialect-independent tree, at least one second tree transformation difference; and determining, based on the at least one second tree transformation difference, the appropriate set of the at least one transformation. The third SQL dialect-independent tree comprises the SQL dialect-independent tree representation of the second SQL dialect of the at least one first unconverted SQL snippet, and the appropriate set of the at least one transformation may be required to convert the first SQL dialect-independent tree into the third SQL dialect-independent tree.

In the computer-readable medium, determining the at least one transformation based on at least one tree transformation difference may comprise: following a first path of a first tree transformation and a second path of a second tree transformation; determining at least one difference between at least one first branch along the first path and at least one second branch along the second path; and determining the at least one transformation that eliminates the at least one difference when the at least one transformation is performed on the first tree.

The computer-readable medium may further comprise: receiving a second partially converted SQL file that has been partially converted from the first SQL dialect into the second SQL dialect; extracting, from the second partially converted SQL file, at least one second unconverted SQL snippet; determining that the at least one second unconverted SQL snippet is the same as the first partially unconverted SQL snippet; and converting the at least one second unconverted SQL snippet into the second SQL dialect of the at least one second unconverted SQL snippet.

In the computer-readable medium, the converting may further comprise: parsing the at least one second unconverted SQL snippet into a SQL dialect-independent tree representation of the at least one second unconverted SQL snippet; generating a SQL dialect-independent tree representation of at least one second converted SQL snippet by applying the appropriate set of the at least one transformation to the SQL dialect-independent tree representation of the at least one second unconverted SQL snippet; and parsing the SQL dialect-independent tree representation of the at least one second converted SQL snippet into the second SQL dialect of the at least one second unconverted SQL snippet.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
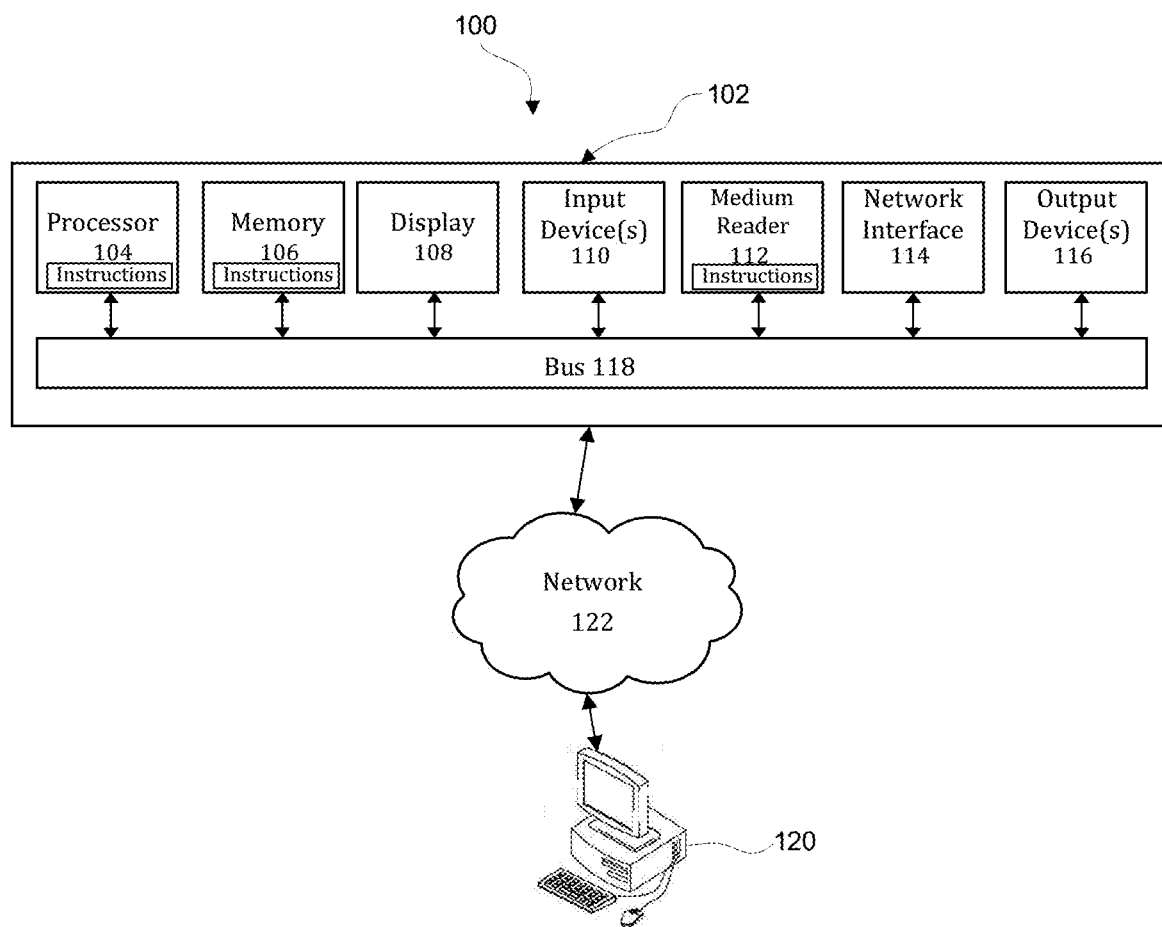
FIG. 1 is a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing an imitation conversion fix implementation tool that utilizes imitation conversion fixes to correct Structured Query Language (SQL) dialect conversion errors.

Figure 2:
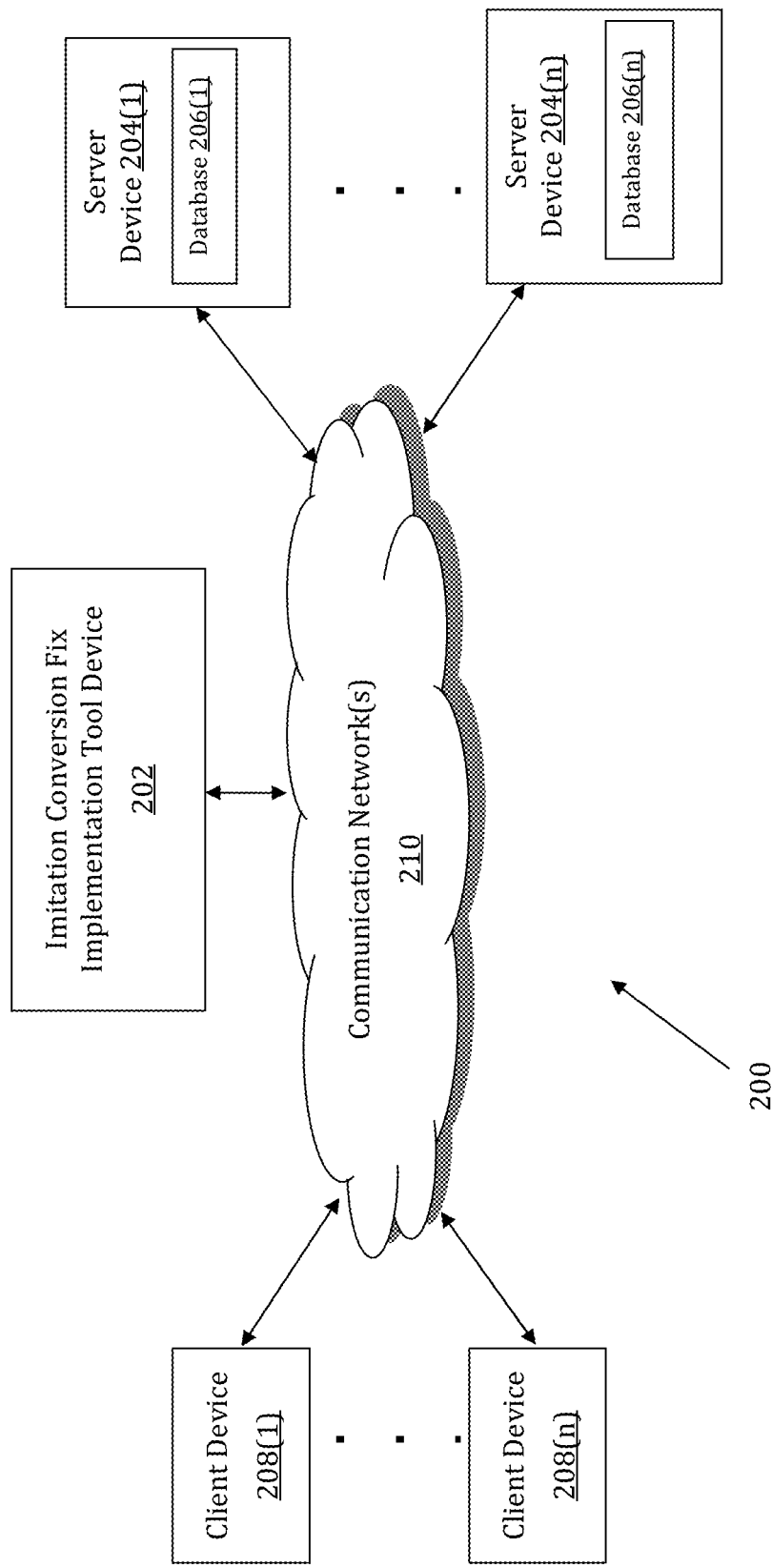
FIG. 2 is a diagram of an exemplary network environment that implements an Imitation Conversion Fix Implementation Tool.

Referring to FIG. 2, a schematic of an exemplary network environment 200 an exemplary network environment that implements an Imitation Conversion Fix Implementation Tool, is illustrated. In an exemplary embodiment, the Imitation Conversion Fix Implementation Tool may be implemented on any networked computer platform, such as, for example, a personal computer (PC).

A method for implementing an imitation conversion fix implementation tool may be implemented by an Imitation Conversion Fix Implementation Tool (ICFIT) device 202. The ICFIT device 202 may be the same or similar to the computer system 102 as described with respect to FIG. 1. The ICFIT device 202 may be a rack-mounted server in a datacenter, an embedded microcontroller (MCU) in an electronic device, or another type of headless system, which is a computer system or device that is configured to operate without a monitor, keyboard and mouse. The ICFIT device 202 may store one or more applications that can include executable instructions that, when executed by the ICFIT device 202, cause the ICFIT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ICFIT device 202 itself, may be located in virtual server(s) running in a cloud-based computing environment rather than being tied to one or more specific physical network computing devices. Also, the application(s) may be running in one or more virtual machines (VMs) executing on the ICFIT device 202. Additionally, in one or more embodiments of this technology, virtual machine(s) running on the ICFIT device 202 may be managed or supervised by a hypervisor.

In the network environment 200 of FIG. 2, the ICFIT device 202 is coupled to a plurality of server devices 204(1)-204 (n) that hosts a plurality of databases 206(1)-206 (n), and also to a plurality of client devices 208(1)-208 (n) via communication network(s) 210. A communication interface of the ICFIT device 202, such as the network interface 114 of the computer system 102 of FIG. 1, operatively couples and communicates between the ICFIT device 202, the server devices 204(1)-204 (n), and/or the client devices 208(1)-208 (n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ICFIT device 202, the server devices 204(1)-204 (n), and/or the client devices 208(1)-208 (n) may be coupled together via other topologies. Additionally, the network environment 200 may include other network devices such as one or more routers and/or switches, for example, which are well known in the art and thus will not be described herein. This technology provides a number of advantages including methods, computer readable media, and ICFIT devices that efficiently implement a method for an imitation conversion fix implementation tool that improves the overall speed, ease, and user experience of cyber defense capability assessment tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ICFIT device 202 may be a standalone device or integrated with one or more other devices or apparatuses, such as one or more of the server devices 204(1)-204 (n), for example. In one particular example, the ICFIT device 202 may include or be hosted by one of the server devices 204(1)-204 (n), and other arrangements are also possible. As another example, the ICFIT device 202 may be integrated with one or more other devices or apparatuses, such as one or more of the client devices 208(1)-208 (n). Moreover, one or more of the devices of the ICFIT device 202 may be in a same or a different communication network including one or more public, private, or cloud networks, for example.

The plurality of server devices 204(1)-204 (n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204 (n) in this example may process requests received from the ICFIT device 202 via the communication network(s) 210 according to the HTTP-based and/or JavaScript Object Notation (JSON) protocol, for example, although other protocols may also be used.

The server devices 204(1)-204 (n) may be hardware or software or may represent a system with multiple servers in a pool, which may include internal or external networks. The server devices 204(1)-204 (n) hosts the databases 206(1)-206 (n) that are configured to store data that relates to a variety of databases.

Although the server devices 204(1)-204 (n) are illustrated as single devices, one or more actions of each of the server devices 204(1)-204 (n) may be distributed across one or more distinct network computing devices that together comprise one or more of the server devices 204(1)-204 (n). Moreover, the server devices 204(1)-204 (n) are not limited to a particular configuration. Thus, the server devices 204(1)-204 (n) may contain a plurality of network computing devices that operate using a master/slave approach, whereby one of the network computing devices of the server devices 204(1)-204 (n) operates to manage and/or otherwise coordinate operations of the other network computing devices.

The server devices 204(1)-204 (n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208 (n) may also be the same or similar to the computer system 102 or the computer device 120 as described with respect to FIG. 1, including any features or combination of features described with respect thereto. For example, the client devices 208(1)-208 (n) in this example may include any type of computing device that can interact with the ICFIT device 202 via communication network(s) 210. Accordingly, the client devices 208(1)-208 (n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208 (n) may run interface applications, such as standard web browsers or standalone client applications, which may provide an interface to communicate with the ICFIT device 202 via the communication network(s) 210 in order to communicate user requests and information. The client devices 208(1)-208 (n) may further include, among other features, a display device, such as a display screen or touchscreen, and/or an input device, such as a keyboard, for example.

Although the exemplary network environment 200 with the ICFIT device 202, the server devices 204(1)-204 (n), the databases 206(1)-206 (n), the client devices 208(1)-208 (n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ICFIT device 202, the server devices 204(1)-204 (n), the databases 206(1)-206 (n), or the client devices 208(1)-208 (n), for example, may be configured to operate as virtual instances on the same physical machine. In other words, one or more of the ICFIT device 202, the server devices 204(1)-204 (n), the databases 206(1)-206 (n), or the client devices 208(1)-208 (n) may operate on the same physical device rather than as separate devices communicating through communication network(s) 210. Additionally, there may be more or fewer ICFIT devices 202, server devices 204(1)-204 (n), databases 206(1)-206 (n), or client devices 208(1)-208 (n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
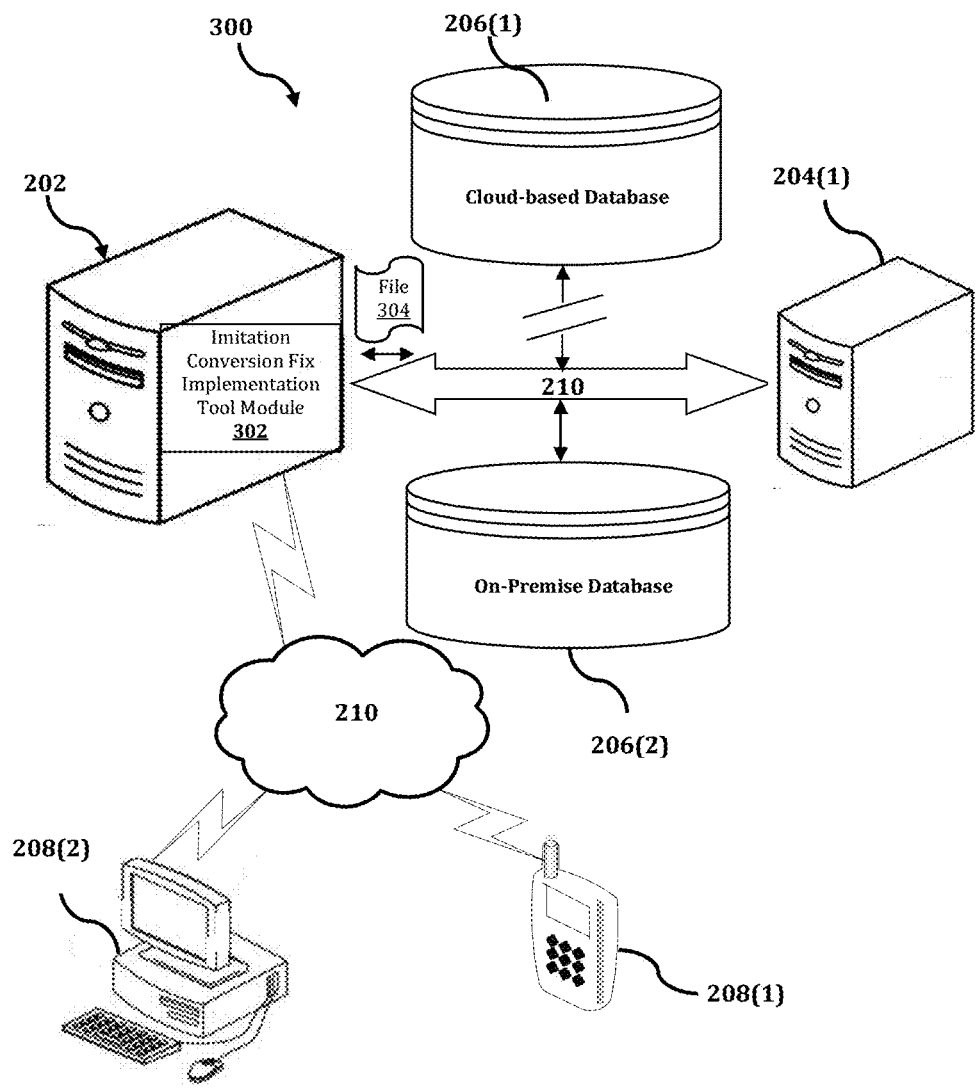
FIG. 3 is a diagram of an exemplary perspective of a network environment that utilizes an Imitation Conversion Fix Implementation Tool to correct Structured Query Language (SQL) dialect conversion errors.

The ICFIT device 202 is described and illustrated in FIG. 3 as including imitation conversion fix implementation tool module 302, although it may include other rules, policies, modules, databases, or applications, for example. As will be described below, imitation conversion fix implementation tool module 302 is configured to utilize imitation conversion fixes to correct SQL dialect conversion errors. Imitation conversion fix implementation tool module 302 may include software that is based on a microservices architecture.

Imitation conversion fix implementation tool module 302 may be integrated with one or more devices or apparatuses, such as client devices 208(1)-208 (n), where imitation conversion fix implementation tool module 302 may be implemented as an application or as an addon or plugin to another application of the one or more devices or apparatuses, and where imitation conversion fix implementation tool module 302 may execute in the background.

An exemplary process 300 for application of an imitation conversion fix implementation tool to an aspect of the network environment of FIG. 2 is illustrated as being executed in FIG. 3. Specifically, a first client device 208(1) and a second client device 208(2) are illustrated as being in communication with ICFIT device 202. In this regard, the first client device 208(1) and the second client device 208(2) may be "clients" of the ICFIT device 202 and are described herein as such. Nevertheless, it is to be known and understood that the first client device 208(1) and/or the second client device 208(2) need not necessarily be "clients" of the ICFIT device 202, or any entity described in association therewith herein. Any additional or alternative relationship may exist between either or both of first client device 208(1), second client device 208(2) and ICFIT device 202, or no relationship may exist.

Further, ICFIT device 202 is illustrated as being able to access cloud-based database 206(1), and on-premise database 206(2). ICFIT device 202 may comprise an imitation conversion fix implementation tool that communicates with cloud-based database 206(1). In addition, the imitation conversion fix implementation tool of ICFIT device 202 may also communicate with on-premise database 206(2). The imitation conversion fix implementation tool module 302 may be configured to access these databases in order to correct SQL dialect conversion errors and migrate data from one database to the other.

Moreover, ICFIT device 202 is also illustrated as being able to receive and transmit SQL file 304 via communication network(s) 210. SQL file 304 may comprise code that is written in one or more of the following dialects: transaction control language (TCL), data manipulation language (DML), data control language (DCL) and data definition language (DFL). Additionally, via communication network(s) 210, ICFIT device 202 may respectively receive and transmit SQL file 302 from and to one or more of the following devices: server device 204(1), cloud-based database 206(1), on-premise database 206(2), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208 (n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the ICFIT device 202 via broadband or cellular communication. Of course, these embodiments are merely exemplary and are not limiting or exhaustive.

Imitation conversion fix implementation tool module 302 may execute a process for implementing an imitation conversion fix implementation tool that utilizes imitation conversion fixes to correct SQL dialect conversion errors. An exemplary process for implementing an imitation conversion fix implementation tool is generally indicated at flowchart 400 in FIG. 4.

Figure 4:
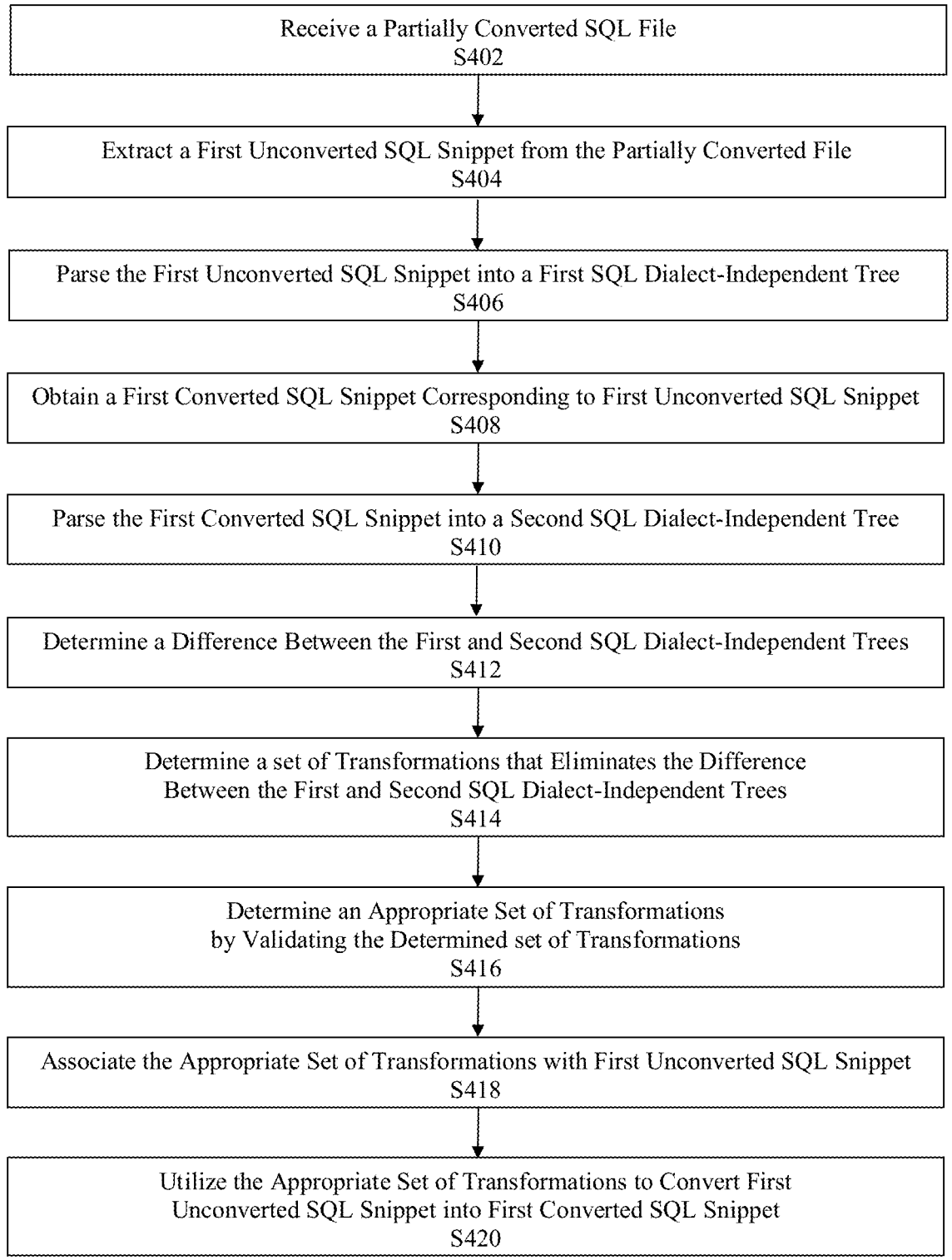
FIG. 4 is a flowchart of an exemplary process for implementing an Imitation Conversion Fix Implementation Tool that corrects SQL dialect conversion errors.

In process 400 of FIG. 4, at step S402, imitation conversion fix implementation tool module 302 receives a partially converted SQL file that has been partially converted from a source SQL dialect into a target SQL dialect. However, at step S402, imitation conversion fix implementation tool module 302 may also, or alternatively, receive a fully unconverted SQL file for conversion into the target SQL dialect. A SQL file received, at step S402, may be received from a standard SQL dialect converter, such as Amazon Web Services (AWS) SQL Conversion Tool (not shown), when a database conversion of the standard SQL dialect converter returns unconverted lines of code. A file received at step S402 may be a SQL file such as SQL file 304.

At step S402, a SQL file may also, or alternatively, be received from a user when that user feeds the SQL file into imitation conversion fix implementation tool module 302 via a public or private network portal. A received SQL file may also, or alternatively, be retrieved from memory, received from a communication network (such as, the Internet or network 122/210), obtained from a source of real-time data, and/or generated by any other input source. A user may use a device such as client device 208(1) or client device 208(2) to provide a SQL file that is received at step S402, and a SQL file that is received at step S402 may also, or alternatively, be gathered through data mining. Moreover, the received SQL file may be obtained from a database or repository such as cloud-based database 206(1) or on-premise database 206(2).

At step S404, imitation conversion fix implementation tool module 302 extracts a first unconverted SQL snippet from the SQL file received at step S402. The first unconverted SQL snippet may comprise one or more unconverted lines of SQL code from the SQL file. Indeed, the first unconverted SQL snippet may comprise every unconverted line of SQL code in the SQL file. Additionally, at step S404, each unconverted SQL snippet that is extracted from the SQL file, may be extracted along with their error code and description.

At step S406, imitation conversion fix implementation tool module 302 parses the first unconverted SQL snippet into a first SQL dialect-independent tree. Imitation conversion fix implementation tool module 302 may utilize a built-in SQL parser to determine the SQL-dialect independent tree representation of the first unconverted SQL snippet. The built-in SQL parser may include additional heuristics that enable the built-in SQL parser to parse SQL snippets into SQL dialect-independent trees. A SQL dialect-independent tree may be a tree structure that represents code and remains uniform, irrespective of the dialect in which that code is written.

At step S408, imitation conversion fix implementation tool module 302 obtains a first converted SQL snippet that corresponds to the first unconverted SQL snippet. The first converted SQL snippet may include one or more lines of code that comprise the same information as one or more lines of code of the first unconverted SQL snippet. However, the one or more lines of code of the first unconverted SQL snippet may be written in (or comprise) a particular SQL dialect, while the one or more lines of code of the first converted SQL snippet may be written in (or comprise) another SQL dialect. The first converted SQL snippet may be obtained from a local or remote location, such as a local or remote memory location for example. Additionally, the first converted SQL snippet may also, or alternatively, be obtained from at least one of a user and a processing device, such as server device 204(1), cloud-based database 206(1), on-premise database 206(2), first client device 208(1), the second client device 208(2), and communication network(s) 210, for example.

In an embodiment, imitation conversion fix implementation tool module 302 may obtain the first converted SQL snippet, at step S408, by prompting a user to provide at least one first fix for the first unconverted SQL snippet and, then, receiving user input comprising the first converted SQL snippet. Thereby, at step S408, imitation conversion fix implementation tool module 302 may obtain the first converted SQL snippet from user input. In other words, a user may provide the at least one first fix for the first unconverted SQL snippet as user input to imitation conversion fix implementation tool module 302, and the at least one first fix may comprise the first converted SQL snippet.

Additionally, or alternatively, at step S408, imitation conversion fix implementation tool module 302 may obtain the first converted SQL snippet from an artificial intelligence and machine learning (AI/ML) model. The AI/ML model may be trained to recognize unconverted SQL snippets and, then, provide associated converted SQL snippets (such as the at least one fix) to imitation conversion fix implementation tool module 302.

In an embodiment, when imitation conversion fix implementation tool module 302 receives at least one first fix to the first unconverted SQL snippet, imitation conversion fix implementation tool module 302 may parse the at least one fix into a second SQL dialect-independent tree that is a representation of the at least one fix, and the at least one fix may comprise the first converted SQL snippet. Therefore, the second SQL dialect-independent tree, may also be referred to as a first fixed tree.

Accordingly, after step S408, once the first converted SQL snippet is obtained, at step S410, imitation conversion fix implementation tool module 302 parses the first converted SQL snippet into the second SQL dialect-independent tree, which may also be known as the first fixed tree. Imitation conversion fix implementation tool module 302 may utilize a built-in SQL parser to determine the SQL-dialect independent tree representation of the first converted SQL snippet. The built-in SQL parser may include additional heuristics that enable the built-in SQL parser to parse SQL snippets into SQL dialect-independent trees. As previously stated, SQL dialect-independent tree may be a tree structure that represents code and remains uniform, irrespective of the dialect in which that code is written.

At step S412, imitation conversion fix implementation tool module 302 determines a difference between the first and second SQL dialect-independent trees. In an exemplary embodiment, imitation conversion fix implementation tool module 302 may determine this difference by creating an XML-based representation of each of the first and second SQL dialect-independent trees and, then, executing a standard text differentiation function to determine differences between the XML-based representation of the first and second SQL dialect-independent trees.

When possible, the differences between the first and second SQL dialect-independent trees may be grouped according to the transformations required to eliminate these differences and, thereby, each the differences may be categorized under at least one of the following transformations: replace, insert, and delete. Additionally, differences may be merged when possible. Moreover, when the differences require more than one transformation, the more than one transformation will only be applied when each of the more than one transformation can be executed.

At step S414, imitation conversion fix implementation tool module 302 determines a set of transformations that eliminates the difference between the first and second SQL dialect-independent trees. In an embodiment, this set of transformations may be based on categories of the determined differences between the XML-based representation of the first and second SQL dialect-independent trees. For example, the set of transformations may comprise the one or more transformations under which those differences are categorized. Each of the determined differences between the XML-based representation of the first and second trees, may be converted back into a SQL dialect-independent tree representation.

In an exemplary embodiment, at step S414 imitation conversion fix implementation tool module 302 may determine a set of transformations that eliminates the differences between the first and second SQL dialect-independent trees, by performing the following operations: (1) following a first path of the first SQL dialect-independent tree and a second path of the second SQL dialect-independent tree; (2) determining at least one difference between at least one first branch along the first path and at least one second branch along the second path; and (3) determining at least one transformation to the first tree, that eliminates the at least one difference between at least one first branch along the first path and at least one second branch along the second path.

At step S416, imitation conversion fix implementation tool module 302 determines an appropriate set of transformations by validating the determined set of transformations. In an exemplary embodiment, imitation conversion fix implementation tool module 302 may validate the determined set of transformations by providing the first converted SQL snippet to a validator for feedback. As previously indicated, the validator may comprise at least one from among an individual, a group of individuals, a knowledge-base, a user interface, and the AI/ML model. When provided with the first converted SQL snippet, the validator may respond by providing feedback to imitation conversion fix implementation tool module 302. The validator's feedback may comprise one of: an indication that the determined set of transformations comprises the appropriate set of transformations, and a second converted SQL snippet.

In an exemplary embodiment, the validator may determine whether the determined set of transformations comprises the appropriate set of transformations by determining whether the code of the first converted SQL snippet is written in the target dialect and comprises the same information as (despite being written in a different dialect from) the code of the first unconverted SQL snippet. When the validator determines that the code of the first converted SQL snippet is not written in the target dialect or does not comprise the same information as (despite being written in a different dialect from) the code of the first unconverted SQL snippet, the validator may respond by providing the second converted SQL snippet to the imitation conversion fix implementation tool module 302, and the second converted SQL snippet may comprise at least one second fix for the first unconverted SQL snippet.

In an exemplary embodiment, the second converted SQL snippet may be written in a different dialect from that of the first unconverted SQL snippet. However, the code of second converted SQL snippet may comprise the same information as the code of the first unconverted SQL snippet. Additionally, in response to being provided the second converted SQL snippet, imitation conversion fix implementation tool module 302 may parse the second converted SQL snippet into a third SQL dialect-independent tree. Accordingly, in the exemplary embodiment, the appropriate set of transformations may comprise the set of transformations that eliminates the difference between the first and third SQL dialect-independent trees.

In an exemplary embodiment, imitation conversion fix implementation tool module 302 may determine the difference between the first and third SQL dialect-independent trees, by creating an XML-based representation of each of the first and third SQL dialect-independent trees and, then, executing a standard text differentiation function to determine differences between the XML-based representation of the first and third SQL dialect-independent trees. When possible, the differences between the first and third SQL dialect-independent trees may be grouped according to the transformations required to eliminate these differences and, thereby, each the differences may be categorized as falling under at least one of the following groups of transformations: replace, insert, and delete. Additionally, differences may be merged when possible.

In an exemplary embodiment, imitation conversion fix implementation tool module 302 may determine a set of transformations that eliminates the differences between the first and third SQL dialect-independent trees. In an embodiment, this set of transformations may be based on categories of the determined differences between the XML-based representation of the first and third SQL dialect-independent trees. For example, the set of transformations may comprise the one or more transformations under which those differences are categorized. Each of the determined differences between the XML-based representation of the first and second trees, may be converted back into a SQL dialect-independent tree representation.

In an exemplary embodiment, imitation conversion fix implementation tool module 302 may determine a set of transformations that eliminates the differences between the first and third SQL dialect-independent trees, by performing the following operations: (1) following a first path of the first SQL dialect-independent tree and a third path of the third SQL dialect-independent tree; (2) determining at least one difference between at least one first branch along the first path and at least one third branch along the third path; and (3) determining at least one transformation to the first tree, that eliminates the at least one difference between at least one first branch along the first path and at least one third branch along the third path.

At step S418, imitation conversion fix implementation tool module 302 associates the appropriate set of transformations with the first unconverted SQL snippet. This association of step S418 may be achieved by any of a number of means, such as recording the association in one or more from among an electronic file, memory, a database, and the cloud, for example. Additionally, imitation conversion fix implementation tool module 302 may use the association of step S418 as training data for its AI/ML model.

In an embodiment of the invention, after step S418, imitation conversion fix implementation tool module 302 may return to step S404 of process 400 to extract a subsequent unconverted SQL snippet from the SQL file received at step S402. Additionally, in this exemplary embodiment, after step S418, imitation conversion fix implementation tool module 302 may also continue to return to step S404 until every unconverted SQL snippet of the SQL file is associated with an appropriate corresponding set of transformations.

At step S420, imitation conversion fix implementation tool module 302 utilizes the appropriate set of transformations to convert a section of another snippet that comprises the first unconverted SQL snippet into the first converted SQL snippet. In an embodiment of the invention, at step S420, imitation conversion fix implementation tool module 302 may utilize the appropriate set of transformations to convert every remaining (e.g., second, third, fourth, . . . etc.) unconverted section of the SQL file that includes the first unconverted SQL snippet into a corresponding (e.g., second, third, fourth, . . . etc.) converted snippet.

In this exemplary embodiment, after converting all of the remaining unconverted SQL file sections that include the first unconverted SQL snippet into the corresponding converted snippet, imitation conversion fix implementation tool module 302 may return to step S404 of process 400 to extract a subsequent unconverted SQL snippet from the SQL file received at step S402. Additionally, in this exemplary embodiment, after step S420, imitation conversion fix implementation tool module 302 may also continue to return to step S404 until all (e.g., first, second, third, fourth, . . . etc.) unconverted SQL snippets of the SQL file have been converted into corresponding (e.g., first, second, third, fourth, . . . etc.) converted snippets. Furthermore, in this exemplary embodiment, process 400 may end or terminate when each unconverted SQL snippet of the SQL file has been converted into corresponding converted snippets. However, the process may also, or alternatively, standby for another unconverted SQL file when each unconverted SQL snippet of the SQL file has been converted into corresponding converted snippets.

Figure 5:
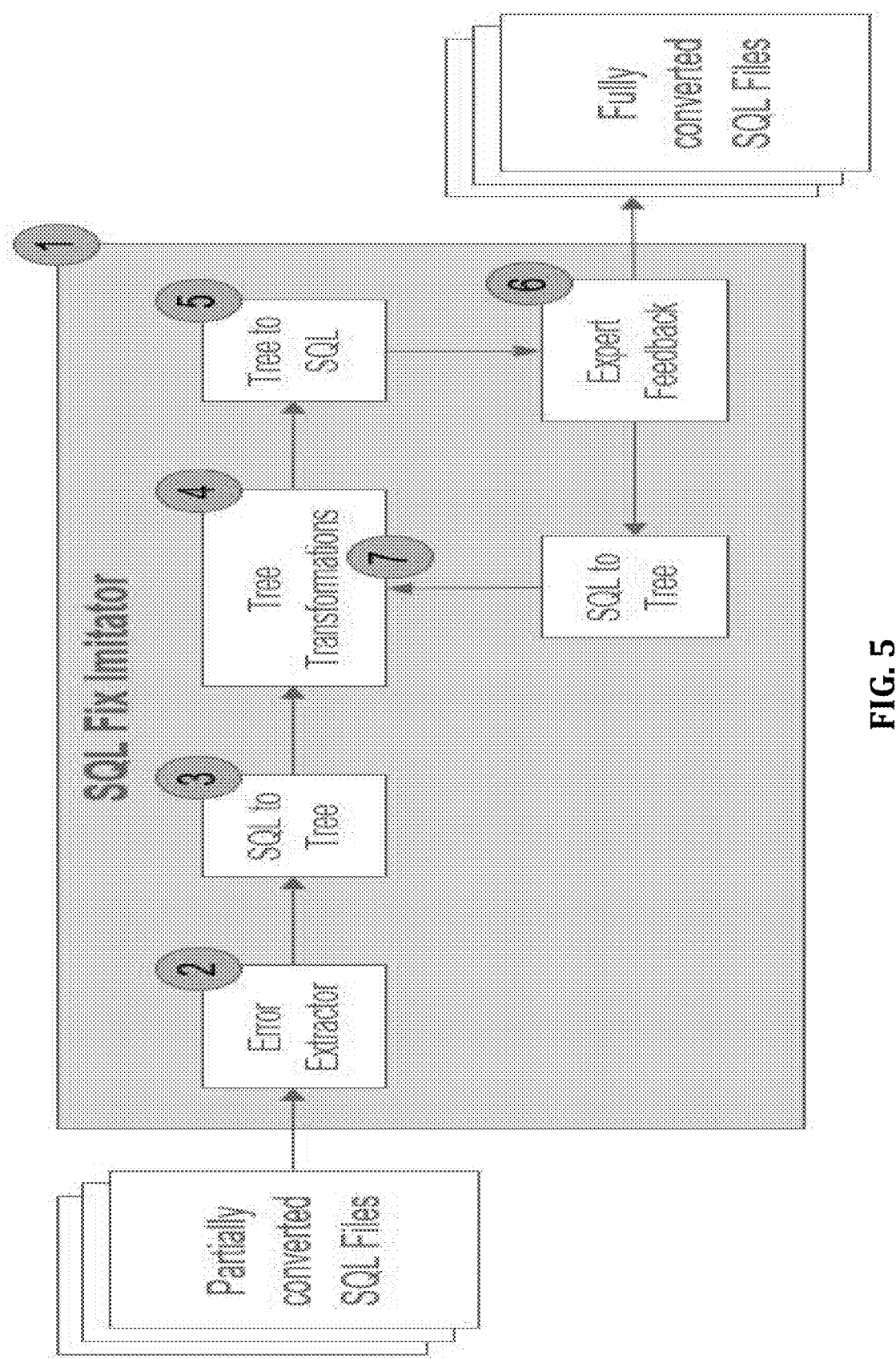
FIG. 5 is a diagram of an exemplary system of a SQL Fix Imitator.

An exemplary system for implementing a SQL Fix Imitator is generally indicated at an exemplary computer environment 500 in FIG. 5. In an exemplary embodiment of the invention, imitation conversion fix implementation tool module 302 comprises SQL Fix Imitator 1. As depicted in FIG. 5, SQL Fix Imitator 1 receives partially converted SQL files as input. In an exemplary embodiment, SQL Fix Imitator 1 may receive the partially converted SQL files from a commercial SQL converter. SQL Fix Imitator 1 may utilize a graphical user interface (GUI) to prompt a user to fix the unconverted SQL snippets of the partially converted SQL files by suggesting and walking the user through fixes, then SQL Fix Imitator 1 may output either fully or partially converted SQL files, depending on which fixes the user elects. In the exemplary embodiment, SQL Fix Imitator 1 may recall one or more fixes from a previous session and suggest them to users during a subsequent session via a GUI of SQL Fix Imitator 1.

As depicted in FIG. 5, when partially converted SQL files (or unconverted SQL files) are received, SQL Fix Imitator 1 performs a process for converting unconverted SQL snippets of the SQL files from their original (and/or a native) SQL dialect into a target (e.g., a cloud-based) SQL dialect. As depicted, the process comprises functions performed by error extractor module 2, SQL to tree module 3, tree transformations module 4, tree to SQL module 5, expert feedback module 6, and SQL to tree module 7 which may the same as (or different from) SQL to tree module 3.

FIG. 5 depicts SQL Fix Imitator 1 as beginning its process for converting the unconverted SQL snippets by extracting every unconverted SQL snippet from SQL files received by SQL Fix Imitator 1. More particularly, error extractor module 2 of SQL Fix Imitator 1 extracts the unconverted SQL snippets from the SQL files.

As depicted in FIG. 5, after the unconverted SQL snippets are extracted from one or more received SQL files, the process for converting unconverted SQL snippets advances to SQL to tree module 3. More particularly, after the extracting operation(s) of error extractor module 2, SQL to tree module 3 parses each SQL snippet into a tree. In an exemplary embodiment, SQL to tree module 3 parses unconverted SQL snippets into a tree by utilizing one or more built-in (and/or native) SQL parsers that include additional heuristics for parsing each SQL snippet into a SQL dialect-independent tree representation of that snippet.

As depicted, after parsing each unconverted SQL snippet into a tree, the process for converting unconverted SQL snippets advances to tree transformations module 4. More particularly, after the parsing operation(s) of SQL to tree module 3, tree transformation module 4 determines a set of transformations that are necessary to resolve (i.e., fix) any discrepancies that prevent the tree generated by SQL to tree module 3 from being converted into a target SQL dialect. In an exemplary embodiment, the tree transformations module may determine the set of transformations in a same manner as imitation conversion fix implementation tool module 302.

As depicted, after determining the set of transformations necessary to fix discrepancies in a tree representation of an extracted unconverted SQL snippet, the process for converting unconverted SQL snippets advances to tree to SQL module 5. More particularly, after the determining operation(s) of tree transformations module 4, tree to SQL module 5 constructs a tree-to-SQL writer for each target dialect (e.g., target SQL dialects that operate on a rule-base translation from tree to text), then tree to SQL module 5 utilizes the tree-to-SQL writer to write all the suggested fixes to the target SQL dialect. Thereby, tree to SQL module 5 converts the tree of an extracted unconverted SQL snippet, by creating a tree-to-SQL writer and utilizing it to implement the fixes suggested by SQL Fix Imitator 1.

As depicted, after parsing trees that correspond to extracted unconverted SQL snippets, the process for converting unconverted SQL snippets advances to expert feedback module 6. More particularly, after tree to SQL module 5 writes the suggested fixes to the target dialect, expert feedback module 6 provides the target dialect implementations of the suggested fixes to a validator for feedback. Expert feedback module 6 may provide the target dialect implementations of the suggested fixes to the validator via a GUI, such as the GUI of SQL Fix Imitator 1.

After receiving the target dialect implementations, the validator evaluates the target dialect implementations of the suggested fixes to determine whether any of them resolves (i.e., fixes) the discrepancies that prevented the tree generated by SQL to tree module 3 from being converted into the target SQL dialect. Thereafter, the validator has the option of accepting a particular fix that has been suggested by SQL Fix Imitator 1 or, if a suggested fix does not exist, the validator also has the option of manually tree to SQL module 5 with the correct fix to the discrepancies that prevented the tree from being converted into the target SQL dialect. By accepting a particular fix, expert feedback module 6 outputs the target SQL dialect implementation of that particular fix as a corresponding converted SQL snippet, which may be recording in the SQL file of its corresponding unconverted SQL snippet.

As depicted, after obtaining expert feedback from a validator, the process converting unconverted SQL snippets may advance to SQL to tree module 3. More particularly, when the validator provides expert feedback module 6 with a correct fix, SQL to tree module 7 coverts it back into a tree and, then, tree transformation module 4 compares this tree against the original tree to determine a set of transformations that resolve (i.e., fix) the discrepancies that prevented the original tree from being converted into a target SQL dialect. Tree transformation module 4 may determine the set of transformations by creating an XML-based representation of each of these trees and, then, executing a standard text differentiation function to determine differences between the XML-based representation of the tree of the correct fix and the tree generated by SQL to tree module 3.

In an exemplary embodiment, SQL Fix Imitator 1 of FIG. 5 keeps track of the frequency of how many times each of its suggested fixes are accepted, and SQL Fix Imitator 1 utilizes this information to rank a confidence of each suggestion of SQL Fix Imitator 1. SQL Fix Imitator may prioritize the suggestions that it provides according to its confidence ranking. Additionally, to maintain accountability for each conversion and potentially augment the confidence ranking based on the accuracy of a software, device or individual's prior fixes, SQL Fix Imitator 1 may record the identity of the software, device or individual that is responsible for each fix.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for correcting a Structured Query Language (SQL) dialect conversion error, the method comprising:
   receiving a first partially converted SQL file that has been partially converted from a first SQL dialect into a second SQL dialect;
   extracting, from the first partially converted SQL file, at least one first unconverted SQL snippet;
   deriving at least one first transformation, wherein the deriving the at least one first transformation comprises:
      parsing the at least one first unconverted SQL snippet into a first SQL dialect-independent tree, wherein the first SQL dialect-independent tree comprises a SQL dialect-independent tree representation of the at least one first unconverted SQL snippet;
      obtaining at least one first converted SQL snippet that includes a first set of code, wherein the at least one first unconverted SQL snippet includes a second set of code, wherein the first set of code and the second set of code include common information, and wherein the first set of code and the second set of code utilize different SQL dialects;
      parsing the at least one first converted SQL snippet into a second SQL dialect-independent tree, wherein the second SQL dialect-independent tree comprises the SQL dialect-independent tree representation of the at least one first converted SQL snippet;
      evaluating at least one first tree transformation difference by comparing the first SQL dialect-independent tree to the second SQL dialect-independent tree; and
      deriving, based on the at least one first tree transformation difference, the at least one first transformation that is required to convert the first SQL dialect-independent tree into the second SQL dialect-independent tree;
   determining whether the at least one first transformation includes an appropriate set of at least one transformation for correcting a corresponding SQL conversion error, wherein the appropriate set of the at least one transformation comprises a first set of transformations that eliminates a difference between the first SQL dialect-independent tree and the second SQL dialect-independent tree; and
   associating the appropriate set of the at least one transformation with the at least one first unconverted SQL snippet.

2. The method of claim 1, wherein the at least one transformation comprises at least one type of transformation from among insert, delete, and replace, wherein the replace type of transformation comprises the insert and the delete types of transformations.

3. The method of claim 1, further comprising:
   receiving a second partially converted SQL file that has been partially converted from the first SQL dialect into the second SQL dialect;
   extracting, from the second partially converted SQL file, at least one second unconverted SQL snippet;
   determining that the at least one second unconverted SQL snippet is the same as the first partially unconverted SQL snippet; and
   converting the at least one second unconverted SQL snippet into the second SQL dialect of the at least one second unconverted SQL snippet.

4. The method of claim 3, wherein the converting further comprises:
   parsing the at least one second unconverted SQL snippet into a SQL dialect-independent tree representation of the at least one second unconverted SQL snippet;
   generating a SQL dialect-independent tree representation of at least one second converted SQL snippet by applying the appropriate set of the at least one transformation to the SQL dialect-independent tree representation of the at least one second unconverted SQL snippet; and
   parsing the SQL dialect-independent tree representation of the at least one second converted SQL snippet into the second SQL dialect of the at least one second unconverted SQL snippet.

5. The method of claim 1, wherein the determining comprises:
   providing, to a validator, the at least one first unconverted SQL snippet and the at least one first converted SQL snippet;
   when the at least one first converted SQL snippet comprises the second SQL dialect of the at least one first unconverted SQL snippet:
   receiving, from the validator, confirmation that the at least one first transformation includes the appropriate set of the at least one transformation; and
   when the at least one first converted SQL snippet does not comprise the second SQL dialect of the at least one first unconverted SQL snippet:
   receiving, from the validator, the second SQL dialect of the at least one first unconverted SQL snippet; and
   determining the appropriate set of the at least one transformation.

6. The method of claim 5, wherein the validator comprises at least one from among: a user, a computer specialist, and an artificial intelligence and machine learning (AI/ML) model.

7. The method of claim 5, wherein the determining the appropriate set of the at least one transformation comprises:
   parsing the second SQL dialect of the at least one first converted SQL snippet into a third SQL dialect-independent tree, wherein the third SQL dialect-independent tree comprises the SQL dialect-independent tree representation of the second SQL dialect of the at least one first unconverted SQL snippet;

determining, by comparing the first SQL dialect-independent tree to the third SQL dialect-independent tree, at least one second tree transformation difference; and determining, based on the at least one second tree transformation difference, the appropriate set of the at least one transformation, wherein the appropriate set of the at least one transformation is required to convert the first SQL dialect-independent tree into the third SQL dialect-independent tree.

8. The method of claim 7, further comprising: deriving the at least one transformation based on at least one tree transformation difference, wherein the deriving the at least one transformation further comprises:

following a first path of a first tree and a second path of a second tree;

determining at least one difference between at least one first branch along the first path and at least one second branch along the second path; and determining the at least one transformation that eliminates the at least one difference when the at least one transformation is performed on the first tree.

9. The method of claim 1, further comprising:

when the first partially converted SQL file comprises at least one unconverted SQL snippet that is not associated with any transformations, and until every unconverted SQL snippet of the first partially converted SQL file is associated with a corresponding transformation, iteratively:

extracting, from the first partially converted SQL file, at least one snippet from among the at least one unconverted SQL snippet that is not associated with any transformations;

deriving at least one additional transformation; and associating the at least one additional transformation with the at least one snippet; and when each unconverted SQL snippet of the first partially converted SQL file is associated with at least one associated transformation, generating a first fully converted SQL file that comprises the second SQL dialect of every SQL snippet of the first partially converted SQL file.

10. A system for correcting a Structured Query Language (SQL) dialect conversion error, the system comprising:

a processor; and memory storing instructions that, when executed by the processor, cause the processor to perform operations comprising:

receiving a first partially converted SQL file that has been partially converted from a first SQL dialect into a second SQL dialect;

extracting, from the first partially converted SQL file, at least one first unconverted SQL snippet;

deriving at least one first transformation, wherein the deriving the at least one first transformation comprises:

parsing the at least one first unconverted SQL snippet into a first SQL dialect-independent tree, wherein the first SQL dialect-independent tree comprises a SQL dialect-independent tree representation of the at least one first unconverted SQL snippet;

obtaining at least one first converted SQL snippet that includes a first set of code, wherein the at least one first unconverted SQL snippet includes a second set of code, wherein the first set of code and the second set of code include common information, and wherein the first set of code and the second set of code utilize different SQL dialects;

parsing the at least one first converted SQL snippet into a second SQL dialect-independent tree, wherein the second SQL dialect-independent tree comprises the SQL dialect-independent tree representation of the at least one first converted SQL snippet;

evaluating at least one first tree transformation difference by comparing the first SQL dialect-independent tree to the second SQL dialect-independent tree; and deriving, based on the at least one first tree transformation difference, the at least one first transformation that is required to convert the first SQL dialect-independent tree into the second SQL dialect-independent tree;

determining whether the at least one first transformation includes an appropriate set of at least one transformation for correcting a corresponding SQL conversion error, wherein the appropriate set of the at least one transformation comprises a first set of transformations that eliminates a difference between the first SQL dialect-independent tree and the second SQL dialect-independent tree; and associating the appropriate set of the at least one transformation with the at least one first unconverted SQL snippet.

11. The system of claim 10, wherein the instructions, when executed by the processor, further cause the processor to perform operations comprising, when the first partially converted SQL file comprises at least one unconverted SQL snippet that is not associated with any transformations, and until every unconverted SQL snippet of the first partially converted SQL file is associated with a corresponding transformation, iteratively:

extracting, from the first partially converted SQL file, at least one snippet from among the at least one unconverted SQL snippet that is not associated with any transformations;

deriving at least one additional transformation; and associating the at least one additional transformation with the at least one snippet; and when each unconverted SQL snippet of the first partially converted SQL file is associated with at least one associated transformation, generating a first fully converted SQL file that comprises the second SQL dialect of every SQL snippet of the first partially converted SQL file.

12. The system of claim 10, wherein the instructions, when executed by the processor, further cause the processor to perform operations comprising:

receiving a second partially converted SQL file that has been partially converted from the first SQL dialect into the second SQL dialect;

extracting, from the second partially converted SQL file, at least one second unconverted SQL snippet;

determining that the at least one second unconverted SQL snippet is the same as the first partially unconverted SQL snippet; and converting the at least one second unconverted SQL snippet into the second SQL dialect of the at least one second unconverted SQL snippet.

13. The system of claim 12, wherein the converting comprises:

parsing the at least one second unconverted SQL snippet into a SQL dialect-independent tree representation of the at least one second unconverted SQL snippet;

generating a SQL dialect-independent tree representation of at least one second converted SQL snippet by applying the appropriate set of the at least one transformation to the SQL dialect-independent tree representation of the at least one second unconverted SQL snippet; and parsing the SQL dialect-independent tree representation of the at least one second converted SQL snippet into the second SQL dialect of the at least one second unconverted SQL snippet.

14. The system of claim 10, wherein the determining comprises:

providing, to a validator, the at least one first unconverted SQL snippet and the at least one first converted SQL snippet;

when the at least one first converted SQL snippet comprises the second SQL dialect of the at least one first unconverted SQL snippet:

receiving, from the validator, confirmation that the at least one first transformation includes the appropriate set of the at least one transformation; and when the at least one first converted SQL snippet does not comprise the second SQL dialect of the at least one first unconverted SQL snippet:

receiving, from the validator, the second SQL dialect of the at least one first unconverted SQL snippet; and determining the appropriate set of the at least one transformation.

15. The system of claim 14, wherein the determining the appropriate set of the at least one transformation comprises:

parsing the second SQL dialect of the at least one first converted SQL snippet into a third SQL dialect-independent tree, wherein the third SQL dialect-independent tree comprises the SQL dialect-independent tree representation of the second SQL dialect of the at least one first unconverted SQL snippet;

determining, by comparing the first SQL dialect-independent tree to the third SQL dialect-independent tree, at least one second tree transformation difference; and determining, based on the at least one second tree transformation difference, the appropriate set of the at least one transformation, wherein the appropriate set of the at least one transformation is required to convert the first SQL dialect-independent tree into the third SQL dialect-independent tree.

16. The system of claim 15, wherein the instructions, when executed by the processor, further cause the processor to perform operations comprising:

deriving the at least one transformation based on at least one tree transformation difference, wherein the deriving the at least one transformation further comprises:

following a first path of a first tree transformation and a second path of a second tree transformation;

determining at least one difference between at least one first branch along the first path and at least one second branch along the second path; and determining the at least one transformation that eliminates the at least one difference when the at least one transformation is performed on the first tree transformation.

17. A non-transitory computer-readable medium for correcting a Structured Query Language (SQL) dialect conversion error, the non-transitory computer-readable medium comprising instructions that, when executed by a processor, cause the processor to perform operations comprising:

receiving a first partially converted SQL file that has been partially converted from a first SQL dialect into a second SQL dialect;

extracting, from the first partially converted SQL file, at least one first unconverted SQL snippet;

deriving at least one first transformation, wherein the deriving the at least one first transformation comprises:

parsing the at least one first unconverted SQL snippet into a first SQL dialect-independent tree, wherein the first SQL dialect-independent tree comprises a SQL dialect-independent tree representation of the at least one first unconverted SQL snippet;

obtaining at least one first converted SQL snippet that includes a first set of code, wherein the at least one first unconverted SQL snippet includes a second set of code, wherein the first set of code and the second set of code include common information, and wherein the first set of code and the second set of code utilize different SQL dialects;

parsing the at least one first converted SQL snippet into a second SQL dialect-independent tree, wherein the second SQL dialect-independent tree comprises the SQL dialect-independent tree representation of the at least one first converted SQL snippet;

evaluating at least one first tree transformation difference by comparing the first SQL dialect-independent tree to the second SQL dialect-independent tree; and deriving, based on the at least one first tree transformation difference, the at least one first transformation that is required to convert the first SQL dialect-independent tree into the second SQL dialect-independent tree;

determining whether the at least one first transformation includes an appropriate set of at least one transformation for correcting a corresponding SQL conversion error, wherein the appropriate set of the at least one transformation comprises a first set of transformations that eliminates a difference between the first SQL dialect-independent tree and the second SQL dialect-independent tree; and associating the appropriate set of the at least one transformation with the at least one first unconverted SQL snippet.

18. The non-transitory computer-readable medium of claim 17, wherein the determining comprises:

providing, to a validator, the at least one first unconverted SQL snippet and the at least one first converted SQL snippet;

when the at least one first converted SQL snippet comprises the second SQL dialect of the at least one first unconverted SQL snippet:

receiving, from the validator, confirmation that the at least one first transformation includes the appropriate set of the at least one transformation; and when the at least one first converted SQL snippet does not comprise the second SQL dialect of the at least one first unconverted SQL snippet:

receiving, from the validator, the second SQL dialect of the at least one first unconverted SQL snippet; and determining the appropriate set of at least one transformation.

* * * * *